United States Patent
Duan et al.

(10) Patent No.: US 10,551,508 B2
(45) Date of Patent: Feb. 4, 2020

(54) QUICK POSITIONING SYSTEM AND VEHICLE-MOUNTED SYSTEM

(71) Applicant: AutoChips Inc., Hefei, Anhui (CN)

(72) Inventors: Xiong Duan, Anhui (CN); Naiqian Jiang, Anhui (CN)

(73) Assignee: AUTOCHIPS INC., Hefei, Anhui (CN)

( * ) Notice: Subject to any disclaimer, the term of this patent is extended or adjusted under 35 U.S.C. 154(b) by 387 days.

(21) Appl. No.: 15/256,376

(22) Filed: Sep. 2, 2016

(65) Prior Publication Data
US 2017/0234989 A1    Aug. 17, 2017

(30) Foreign Application Priority Data
Feb. 15, 2016 (CN) .......................... 2016 1 0086177

(51) Int. Cl.
| | |
|---|---|
| *G01S 19/48* | (2010.01) |
| *G01S 19/42* | (2010.01) |
| *G01S 19/12* | (2010.01) |
| *G01S 19/13* | (2010.01) |

(52) U.S. Cl.
CPC .............. *G01S 19/48* (2013.01); *G01S 19/42* (2013.01); *G01S 19/12* (2013.01); *G01S 19/13* (2013.01)

(58) Field of Classification Search
CPC .......... G01S 19/48; G01S 19/13; G01S 19/12; G01S 19/42
USPC ........................ 342/357.31, 357.2; 701/471
See application file for complete search history.

(56) References Cited

U.S. PATENT DOCUMENTS

| | | | | |
|---|---|---|---|---|
| 5,646,630 A | * | 7/1997 | Sheynblat | G01S 19/07 342/357.31 |
| 5,831,574 A | * | 11/1998 | Krasner | G01S 19/05 342/357.74 |
| 6,816,782 B1 | * | 11/2004 | Walters | G01C 21/20 701/426 |
| 6,859,173 B2 | * | 2/2005 | Spilker, Jr. | G01S 5/145 342/463 |
| 7,952,518 B2 | * | 5/2011 | Whelan | G01S 19/256 342/357.29 |
| 8,164,519 B1 | * | 4/2012 | Bedoya Martinez | G01S 19/34 342/357.69 |
| 9,507,025 B2 | * | 11/2016 | Wang | G01S 19/06 |
| 2005/0170846 A1 | | 8/2005 | Jeon et al. | |

(Continued)

FOREIGN PATENT DOCUMENTS

| | | |
|---|---|---|
| CN | 1904638 A | 1/2007 |
| CN | 103209387 A | 7/2013 |

(Continued)

*Primary Examiner* — Chuong P Nguyen
(74) *Attorney, Agent, or Firm* — Cheng-Ju Chiang (57) ABSTRACT

A quick positioning method and a vehicle-mounted system are disclosed. The quick positioning method includes: acquiring position information from an external positioning terminal the same time when the vehicle-mounted system is started, and determining continuously whether position information is available from a local GPS positioning module; and using the position information acquired from the external positioning terminal until position information is available from the local GPS positioning module. By the above method, there would be available position information before the GPS module of the vehicle-mounted system is fully activated, thus effectively enhancing the positioning efficiency of the vehicle-mounted system.

10 Claims, 3 Drawing Sheets

(56) References Cited

U.S. PATENT DOCUMENTS

| | | | | |
|---|---|---|---|---|
| 2007/0254676 A1* | 11/2007 | Pedigo | ................... | G01S 19/05 |
| | | | | 455/456.6 |
| 2009/0085801 A1 | 4/2009 | Sengupta et al. | | |
| 2009/0289845 A1* | 11/2009 | Gum | ...................... | G01S 19/26 |
| | | | | 342/357.31 |
| 2009/0315769 A1 | 12/2009 | Whelan et al. | | |
| 2010/0066599 A1* | 3/2010 | Liu | ........................ | G01S 19/05 |
| | | | | 342/357.31 |
| 2011/0039578 A1* | 2/2011 | Rowitch | ................... | G01S 5/10 |
| | | | | 455/456.1 |

FOREIGN PATENT DOCUMENTS

| | | |
|---|---|---|
| CN | 204064514 U | 12/2014 |
| CN | 204903765 U | 12/2015 |

* cited by examiner

QUICK POSITIONING SYSTEM AND VEHICLE-MOUNTED SYSTEM

FIELD OF THE DISCLOSURE

The present disclosure generally relates to positioning technologies of vehicle-mounted systems, and more particularly, to a quick positioning method and a vehicle-mounted system.

BACKGROUND OF THE DISCLOSURE

A conventional vehicle-mounted GPS (global positioning system) unit can provide high-precision positioning, but may require time to obtain satellite information for successful positioning. The cold boot process of the vehicle-mounted GPS unit can take up to 30-40 seconds or longer for successful positioning in remote areas. However, the startup time of a vehicle-mounted operating system is generally within 10 seconds, which is far shorter than the boot-up time of the vehicle-mounted GPS unit. Thus, no positioning information would be available for the vehicle-mounted operating system while waiting for the vehicle-mounted GPS unit to activate. Hence, accelerating the GPS positioning speed of the vehicle-mounted navigation system is a key technical problem to be addressed in the current automotive field. Therefore, there is a need for a quick positioning method and an associated vehicle-mounted system to address the above technical problem.

SUMMARY OF THE DISCLOSURE

A quick positioning method and a vehicle-mounted system are disclosed.

According to one aspect of the present disclosure, a quick positioning method implemented on a vehicle-mounted system may include: acquiring position information from an external positioning terminal in the vicinity the same time when the vehicle-mounted system is started, and continuously determining whether position information is available from a local GPS positioning module; and using the position information from the external positioning terminal until position information is available from the local GPS positioning module.

The method may further include: after determining that position information is available from the local GPS positioning module, using the position information from the local GPS positioning module.

The method may further include: after determining that position information is available from the local GPS positioning module, stopping acquiring position information from the external positioning terminal and stopping determining whether position information is available from the local GPS positioning module.

The method may further include: after determining that position information is available from the local GPS positioning module, continuing acquiring position information from the external positioning terminal; and once the position information is not available from the local GPS positioning module, turning to use the position information from the external positioning terminal.

The step of acquiring position information from the external positioning terminal may include: searching for at least one external positioning terminal in the vicinity of the vehicle-mounted system; selecting and connecting to the external positioning terminal with the highest priority according to a predetermined priority policy; and acquiring position information from the external positioning terminal with the highest priority.

The step of selecting and connecting to the external positioning terminal with the highest priority according to a predetermined priority policy may include: selecting and connecting to the external positioning terminal which takes the least time to build up a connection with the vehicle-mounted system.

The step of selecting and connecting to the external positioning terminal with the highest priority according to a predetermined priority policy may alternatively include: selecting and connecting to the external positioning terminal with the highest positioning precision based on device types of the at least one external positioning terminal in the vicinity.

According to another aspect of the present disclosure, a vehicle-mounted system is provided. The vehicle-mounted system comprises a processing module, a reception module, and a local GPS positioning module. The processing module may control the reception module to acquire position information from an external positioning terminal simultaneously the same time when the vehicle-mounted system is started, and may continuously determine whether position information is available from the local GPS positioning module. The processing module may continue using the position information from the external positioning terminal until the position information is available from the local GPS positioning module.

The processing module may use the position information from the local GPS positioning module after it determines that the position information is available from the local GPS positioning module.

After it determines that the position information is available from the local GPS positioning module, the processing module may control the reception module to stop acquiring position information from the external positioning terminal, and may at the same time stop determining whether position information is available from the local GPS positioning module.

After it determines that the position information is available from the local GPS positioning module, the processing module may control the reception module to continue acquiring position information from the external positioning terminal, so that when the position information is not available from the local GPS positioning module, the vehicle-mounted system can turn to use the position information from the external positioning terminal.

The processing module may control the reception module to search for at least one external positioning terminal in the vicinity of the vehicle-mounted system and to select and connect to the external positioning terminal with the highest priority according to a predetermined priority policy, and may control the reception module to acquire the position information from the external positioning terminal with the highest priority.

The processing module may control the reception module to select and connect to the external positioning terminal which takes the least time to build up a connection with the vehicle-mounted system.

The processing module may control the reception module to select and connect to the external positioning terminal with the highest positioning precision based on device types of the at least one external positioning terminal in the vicinity.

Differing from the prior art, the vehicle-mounted system in the present disclosure can acquire and use the position information from an external positioning terminal after the vehicle-mounted system is started and before any position information is available from the local GPS positioning module, thus there would be available position information before the GPS unit of the vehicle-mounted system fully boots, thus effectively promoting the positioning efficiency of the vehicle-mounted system.

DETAILED DESCRIPTION OF THE DISCLOSURE

Hereinafter a detailed description will be rendered to the disclosure with reference made to the following embodiments and accompanying drawings.

Figure 1:
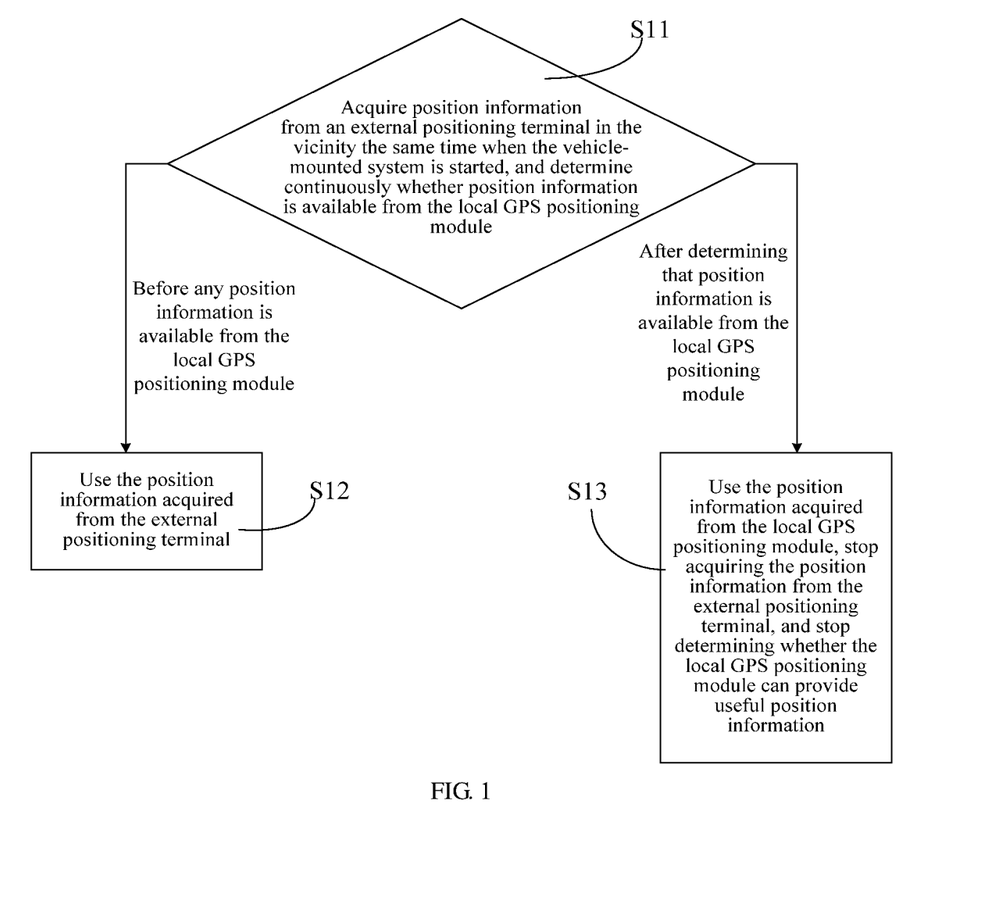
FIG. 1 shows a flowchart illustrating a quick positioning method according to one embodiment of the disclosure.

FIG. 1 shows a flowchart illustrating a quick positioning method according to one embodiment of the disclosure, which may be implemented on a vehicle-mounted system. The quick positioning method may include the following steps.

Step S11: acquiring position information from an external positioning terminal in the vicinity the same time when the vehicle-mounted system is booting up, and determining whether any position information is available from a GPS (global positioning system) positioning module of the vehicle-mounted system.

The external positioning terminal can include, such as a smart phone, a laptop, a tablet computer, another vehicle-mounted system in the vicinity, a hand-held navigation device, or any other terminal equipment with positioning capability. Typically, the step of determining whether position information is available from the GPS positioning module of the vehicle-mounted system comprises determining whether the GPS positioning module of the vehicle-mounted system has booted up and completed successful positioning. If yes, it means that useful position information is available from the local GPS positioning module (i.e., the GPS positioning module of the vehicle-mounted system); otherwise, it means the position information would be currently unavailable from the local GPS positioning module.

The vehicle-mounted system may immediately search for a connectible external positioning terminal to acquire position information the same time when the vehicle-mounted system is started. The vehicle-mounted system may include a wired or wireless connection module to connect to the external positioning terminal in a wired or wireless manner, such as WiFi, Bluetooth, radio, Zigbee, USB cable connection, HDMI high-definition cable connection, RJ45 network cable connection, and so forth. Typically, a Wi-Fi connection is applied in the present embodiment. After the wired or wireless connection module is activated, it can communicate with the external positioning terminal and thus acquire the desired position information from the external positioning terminal. The vehicle-mounted system may have been previously paired with some external positioning terminals. To be specific, the vehicle-mounted system, prior to the current startup, had already been connected to some external positioning terminal and may further store the connection record.

Step S12: using the position information acquired from the external positioning terminal in the vicinity. The step S12 is performed before it is determined that position information is available from the GPS positioning module of the vehicle-mounted system in the previous step S11.

If in step S11 it is determined that it is available to acquire position information from local GPS positioning module, then enter step S13. Step 13: using the position information acquired from the local GPS positioning module, stop acquiring the position information from the external positioning terminal in the vicinity, and stop detect whether the local GPS positioning module can provide available position information.

Use of the position information in the above steps S12 and S13 may include: applying the position information to the application programs which may require the position information, such as a navigation map program.

In one case, the local GPS positioning module may be activated only after the vehicle-mounted system has booted up, so as to get position information. Since the vehicle-mounted system can use the position information acquired from the external positioning terminal before the local GPS positioning module can provide any useful position information, therefore saving time required for the activation and positioning of the local GPS positioning module.

In another case, the local GPS positioning module may be activated simultaneously when the vehicle-mounted system is started, but the local GPS positioning module might have not yet acquired position information when the startup of the vehicle-mounted system has been completed, thus the time required for the positioning of the local GPS positioning module can be saved compared with the prior art.

In the present embodiment, the vehicle-mounted system can acquire and use the position information from the external positioning terminal after the vehicle-mounted system is started and before any position information is available from the local GPS positioning module, thus there would be available position information for the vehicle-mounted system before the local GPS module fully boots up, enhancing the positioning efficiency of the vehicle-mounted system.

Figure 2:
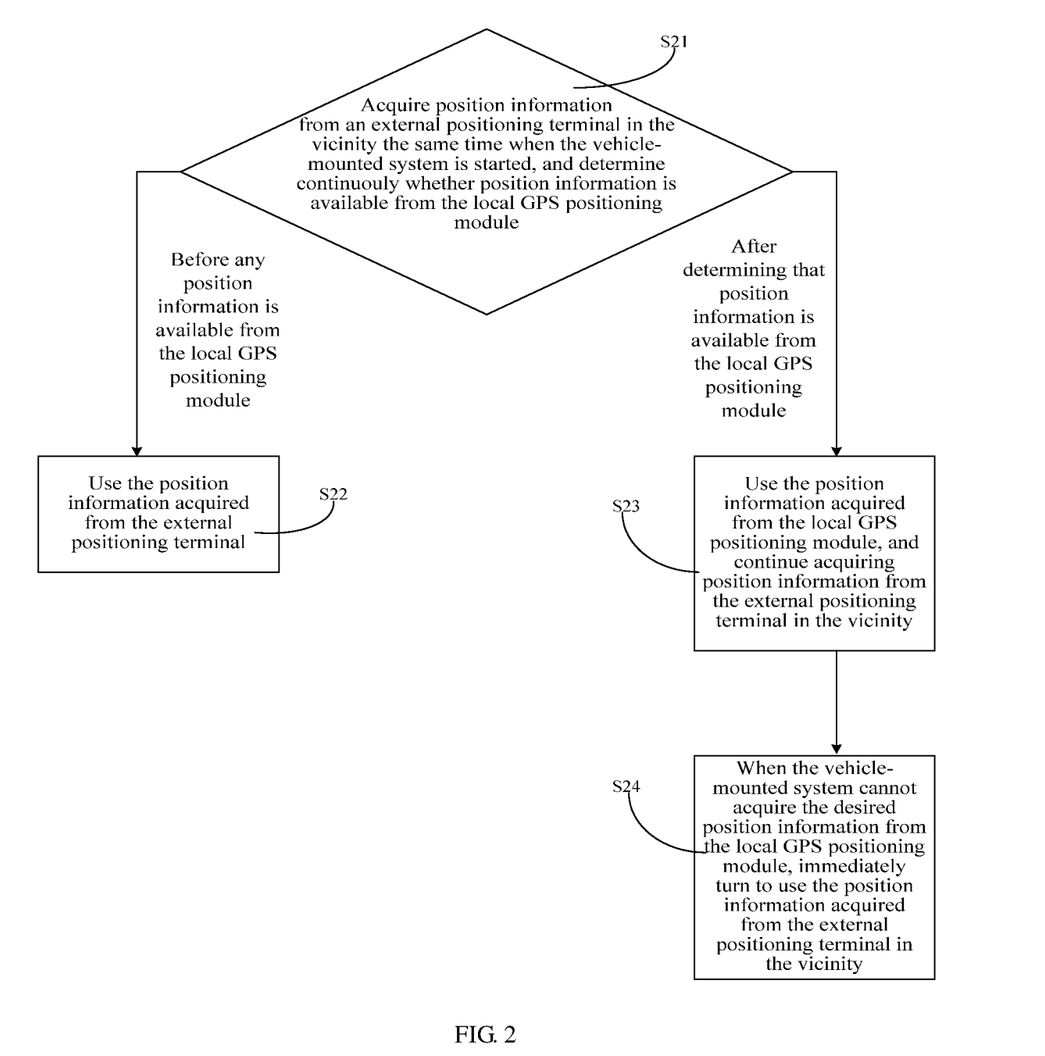
FIG. 2 shows a flowchart illustrating a quick positioning method according to another embodiment of the disclosure.

FIG. 2 shows a flowchart of a quick positioning method according to another embodiment of the disclosure. The quick positioning method may include the following steps.

Step S21: acquiring position information from an external positioning terminal in the vicinity the same time when the vehicle-mounted system is booting up, and determining whether any position information is available from the local GPS positioning module.

Preferably, in the present embodiment, the vehicle-mounted system may search for at least one external positioning terminal in the vicinity of the vehicle-mounted system, select and connect to the external positioning terminal with the highest priority according to a predetermined priority policy, and acquire position information from the external positioning terminal with the highest priority.

Specifically, according to time required for building connection with the vehicle-mounted system, the vehicle-mounted system may select and connect to the external positioning terminal which need lest time to build up a connection with it. For example, if an external positioning terminal in the vicinity has already been previously paired with the vehicle-mounted system, and the corresponding connection record is also saved, then no verification would be needed in the subsequent connection, which can thus greatly accelerate the connection speed. Therefore, the vehicle-mounted system may typically choose such a positioning terminal and connect to it. In other embodiments, according to the device type of the external positioning terminals, the vehicle-mounted system may select and connect to the external positioning terminal with the highest positioning precision. Alternatively, the priority policy can combine the above two manners. For example, on the premise that the connection times are below a threshold value, the external positioning terminal with the highest positioning precision will be selected and connected to. However, the specific configuration of the priority policy is by no means limited thereto, and those skilled in the art can appreciate that the priority policy may also be formulated in other forms. For instance, the priorities of the external positioning terminals can be set manually. Taking as an example, the vehicle owner can set the priority level of his own mobile phone to be the highest, thus the mobile phone will be first chosen to connect to.

Step S22: using the position information acquired from the external positioning terminal in the vicinity. The step S22 is performed before it is determined any position information is available from the local GPS positioning module in the previous step S21.

Step S22 is similar to previous step S12, and it will not be detailed herein.

If in step S21 it is determined it is available to acquire position information from local GPS positioning module, then enter steps S23 and S24. Step S23: using the position information acquired from the local GPS positioning module, and meanwhile continuing acquiring position information from the external positioning terminal. Step S24: turning to use the position information acquired from the external positioning terminal when the vehicle-mounted system cannot acquire any position information from the local GPS positioning module.

After determining that it is available to obtain position information from the local GPS positioning module, the vehicle-mounted system may use the position information acquired from the local GPS positioning module, but may meanwhile continue to acquire position information from the external positioning terminal and continuously determine whether position information is available from the local GPS positioning module. When the vehicle-mounted system cannot acquire any position information from the local GPS positioning module, it may immediately turn to use the position information acquired from the external positioning terminal, thus enabling seamless connectivity. For example, when the vehicle-mounted system determines that the local GPS positioning module has been fully activated and successfully receives position information, it may use the position information acquired from the local GPS positioning module, and may continue acquiring position information from the external positioning terminal and determine nonstop whether the local GPS positioning module malfunctions. If determining that the local GPS positioning module is malfunctioning, which means the local GPS positioning module can no longer provide any position information, the vehicle-mounted system can immediately turn to use the position information acquired from the external positioning terminal. It should be appreciated that in the subsequent process following the step S24, if it is determined that the local GPS positioning module can provide useful position information again, then the vehicle-mounted terminal may then immediately turn to use the position information acquired from the local GPS positioning module. Again, when no position information is available from the local GPS positioning module, the vehicle-mounted system may go back to use the position information from the external positioning terminal. That is, the position information from the local GPS positioning module will be used, if it is available; otherwise when not available, the external positioning terminal will be turned to immediately and the position information from the external positioning terminal will be used. Typically, depending on the availability of the position information from the local GPS positioning module, the vehicle-mounted system may switch between the local GPS positioning module and the external positioning terminal.

In the present embodiment, the vehicle-mounted system can acquire and use the position information from an external positioning terminal after the vehicle-mounted system is started and before any position information is available from the local GPS positioning module. Thus, there would be available position information for the vehicle-mounted system before the local GPS module fully boots up to enhance the positioning efficiency of the vehicle-mounted system. Furthermore, the vehicle-mounted system can choose the external positioning terminal with the highest priority level according to a predetermined priority policy to acquire position information therefrom, thus further increasing the positioning speed of the vehicle-mounted system.

Figure 3:
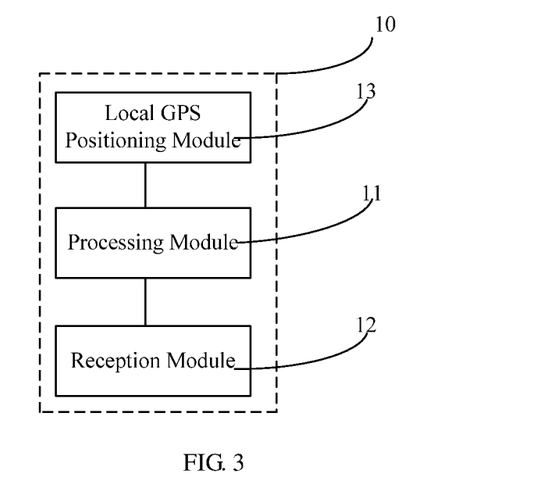
FIG. 3 is a block diagram of a vehicle-mounted system according to an embodiment of the disclosure.

Referring now to FIG. 3, a block diagram of a vehicle-mounted system according to an embodiment of the disclosure is shown. The vehicle-mounted system 10 may include a processing module 11, a reception module 12, and a local GPS positioning module 13.

In other embodiments, the vehicle-mounted system 10 can further include other functional modules, such as an audio/video playing system, a parking monitoring system, and so forth.

The processing module 11 may control the reception module 12 to acquire position information from an external positioning terminal at the same time the vehicle-mounted system 10 is started, and determine whether any position information is available from the local GPS positioning module 13. The processing module 11 may use the position information from the external positioning terminal until it determines position information is available from the local GPS positioning module 13.

Preferably, the processing module 11 may use the position information from the local GPS positioning module 13 after it determines position information is available from the local GPS positioning module 13.

Preferably, the processing module 11 may control the reception module 12 to search for at least one external positioning terminal in the vicinity to connect in order to acquire position information the same time when the operating system of the vehicle-mounted system 10 is initially started. The external positioning terminal can be connected to the reception module 12 of the vehicle-mounted system 10 in a wired or wireless manner, such as WiFi, Bluetooth, radio, Zigbee, USB cable connection, HDMI high-definition cable connection, RJ45 network cable connection, and so forth. Typically, a WiFi connection is employed in the present embodiment. After the reception module 12 of the vehicle-mounted system 10 is activated, it can then communicate with the external positioning terminal and thus acquire the desired position information therefrom. The vehicle-mounted system 10 may have been previously paired with some external positioning terminals. To be specific, the vehicle-mounted system 10 may, prior to the current startup, have been connected beforehand to some external positioning terminal and may further store the connection record.

Preferably, in the present embodiment, after the processing module 11 determines position information is available from the local GPS positioning module 13, it may control the reception module 12 to stop acquiring position information from the external positioning terminal, and meanwhile may stop determining whether position information is available from the local GPS positioning module 13.

In other embodiments, after the processing module 11 determines position information is available from the local GPS positioning module, the processing module 11 may control the reception module 12 to continue acquiring the position information from the external positioning terminal, so that once the vehicle-mounted system 10 cannot acquire position information from the local GPS positioning module 13, it can turn to use the position information from the external positioning terminal, so as to enable seamless connectivity. For example, when the processing module 11 determines that the local GPS positioning module 13 has been fully activated and successfully get position information, it may use the position information acquired from the local GPS positioning module 13, and may continue acquiring position information from the external positioning terminal and determine whether the local GPS positioning module 13 malfunctions. If determining the local GPS positioning module 13 is malfunctioning, which means the local GPS positioning module 13 can no longer provide any position information, then the vehicle-mounted system can immediately turn to use the position information acquired from the external positioning terminal. It should be appreciated that in the subsequent process, if the processing module 11 determines that the local GPS positioning module 13 can provide useful position information again, then the vehicle-mounted system 10 may immediately turn to use the position information acquired from the local GPS positioning module 13. Again, if the processing module 11 determines that no position information is available from the local GPS positioning module 13, the vehicle-mounted system 10 may switch to use the position information from the external positioning terminal. That is, the position information from the local GPS positioning module 13 will be used, if it is available; otherwise when not available, the external positioning terminal will be turned to immediately and the position information therefrom would be used. Typically, depending on the availability of the position information from the local GPS positioning module 13, the vehicle-mounted system 10 may switch between the local GPS positioning module 13 and the external positioning terminal.

Typically, the processing module 11 may control the reception module 12 to search for at least one external positioning terminal in the vicinity of the vehicle-mounted system 10 and to select and connect to the external positioning terminal with the highest priority according to a predetermined priority policy, and may control the reception module 12 to acquire position information from the external positioning terminal with the highest priority.

Specifically, the processing module 11 may control the reception module 12 to select and connect to the external positioning terminal which takes the least time to build up connection with the vehicle-mounted system 10. For example, if an external positioning terminal in the vicinity has been previously paired with the vehicle-mounted system 10, and the corresponding connection record is saved, then no verification would be needed in the subsequent connection, which can thus greatly accelerate the connection speed. Therefore, the vehicle-mounted system 10 may typically give such an external positioning terminal highest priority and then connect to it. In other embodiments, according to the device types of the at least one external positioning terminal in the vicinity, the processing module 11 can control the reception module 12 to select and connect to the external positioning terminal with the highest positioning precision. Alternatively, the priority policy can combine the above two manners. For example, on the premise that the connection times are below a threshold value, the external positioning terminal with the highest positioning precision will be selected and connected to. However, the specific configuration of the priority policy is by no means limited thereto, and those skilled in the art can appreciate that the priority policy can also be formulated in other forms. For instance, the priorities of the external positioning terminals can be set manually. Taking as an example, the vehicle owner may set the priority level of his mobile phone to be the highest, thus the mobile phone will be first chosen to connect to.

The vehicle-mounted system may be implemented by various hardware, software, firmware, or combination thereof. For instance, the processing module may be implemented by a processor, microprocessor, Application Specific Integrated Circuit (ASIC) or a digital signal processor, etc. The reception module may be a transceiver or receiver circuit. In addition, the local GPS module may include a conventional GPS circuit, etc. These implementation examples are just for illustration, and the application is not limited in this respect.

The vehicle-mounted system, according to the present embodiment, can acquire and use the position information from an external positioning terminal after the vehicle-mounted system is started and before any position information is available from the local GPS positioning module, thus there would be available position information for the vehicle-mounted system before the local GPS module fully boots up, enhancing the positioning efficiency of the vehicle-mounted system. In addition, the vehicle-mounted system can choose the external positioning terminal with the highest priority level according to the predetermined priority policy to acquire position information therefrom, thus further increasing the positioning speed of the vehicle-mounted system.

Figure 4:
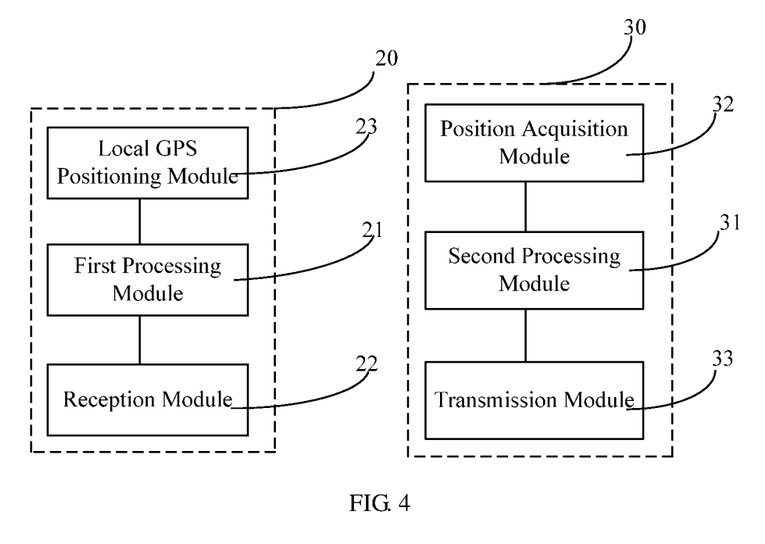
FIG. 4 is a block diagram of a quick positioning system according to an embodiment of the disclosure.

Referring now to FIG. 4, a block diagram of a quick positioning system according to an embodiment of the present disclosure is shown. The quick positioning system may include a vehicle-mounted system 20 and an external positioning terminal 30.

The vehicle-mounted system 20 may include a first processing module 21, a reception module 22, and a local GPS positioning module 23.

In some embodiments, the vehicle-mounted system 20 can further include other functional modules, such as an audio/video playing system, a parking monitoring system, and so forth.

The external positioning terminal 30 may include a second processing module 31, a position acquisition module 32, and a transmission module 33.

The second processing module 31 may control the position acquisition module 32 to acquire position information and send the acquired position information to the transmission module 33. Typically, the position acquisition module 32 may be a GPS positioning module configured in the external positioning terminal 30. In addition, the position acquisition module 32 can also be a network communication module, which can acquire the desired position information from a mobile network.

The first processing module 21 may control the reception module 22 to acquire position information from the transmission module 33 of the external positioning terminal 30 located in the vicinity of the vehicle-mounted system 20 at the same time the vehicle-mounted system 20 is started, and may determine whether position information is available from the local GPS positioning module 23. The first processing module 21 may use the position information acquired from the transmission module 33 of the external positioning terminal 30 until it determines position information is available from the local GPS positioning module 23.

Typically, the first processing module 21 may detect whether the local GPS positioning module 23 has fully booted up and completed successful positioning. If yes, it means that the local GPS positioning module 23 can provide useful position information; otherwise, it means the position information would be currently unavailable from the local GPS positioning module 23.

The first processing module 21 may use the position information from the local GPS positioning module 23 after the first processing module 21 determines that position information is available from the local GPS positioning module 23.

In the present embodiment, after the first processing module 21 determines position information is available from the local GPS positioning module 23, it may control the reception module 22 to stop acquiring position information from the transmission module 33 of the external positioning terminal 30, and meanwhile may stop determining whether position information is available from the local GPS positioning module 23. In other embodiments, after the first processing module 21 determines position information is available from the local GPS positioning module 23, it may control the reception module 22 to continue acquiring the position information from the transmission module 33 of the external positioning terminal 30, so that once the vehicle-mounted system 20 cannot acquire position information from the local GPS positioning module 23, it can immediately turn to use the position information acquired from the transmission module 33 of the external positioning terminal 30.

For example, when the first processing module 21 determines that the local GPS positioning module 23 has been fully activated and successfully receives position information, it may use the position information acquired from the local GPS positioning module 23, and may control the reception module 22 to continue acquiring position information from the transmission module 33 of the external positioning terminal 30, and continuously determine whether the local GPS positioning module 23 malfunctions. If determining the local GPS positioning module 23 to be malfunctioning, which means that the local GPS positioning module 23 can no longer provide any position information, then the vehicle-mounted system 20 will immediately turn to use the position information acquired from the transmission module 33 of the external positioning terminal 30. It should be appreciated that in the subsequent process, if the first processing module 21 determines that the local GPS positioning module 23 can provide useful position information again, the vehicle-mounted system 20 may then immediately turn to use the position information acquired from the local GPS positioning module 23. Again, if the first processing module 21 determines that no position information is available from the local GPS positioning module 23, the vehicle-mounted system may return to use the position information from the transmission module 33 of the external positioning terminal 30. That is, the position information from the local GPS positioning module 23 will always be preferably used, if it is available; otherwise when it is not available, the external positioning terminal 30 will be turned to immediately and the position information therefrom will then be used. Typically, depending on the availability of the position information from the local GPS positioning module 23, the vehicle-mounted system 20 may switch between the local GPS positioning module 13 and the external positioning terminal 30.

Typically, the first processing module 21 may control the reception module 22 to search for at least one external positioning terminal 30 in the vicinity of the vehicle-mounted system 20, control the reception module 22 to select and connect to the external positioning terminal 30 with the highest priority according to a predetermined priority policy and to acquire position information from the transmission module 33 of the external positioning terminal 30 with the highest priority. The reception module 22 may be connected to and communicate with the transmission module 33 of the external positioning terminal 30, to acquire position information from the transmission module 33.

Preferably, the first processing module 21 may control the reception module 22 to search for at least one external positioning terminal in the vicinity to connect in order to acquire position information from the transmission module 33 of the external positioning terminal 30 at the same time the operating system of the vehicle-mounted system 20 is initially started. In some embodiments, the transmission module 33 of the external positioning terminal 30 can be connected to the reception module 22 of the vehicle-mounted system 20 in a wired or wireless manner, such as WiFi, Bluetooth, radio, Zigbee, USB cable connection, HDMI high-definition cable connection, RJ45 network cable connection, and so forth. Typically, a WiFi connection can be applied in the present embodiment. When the reception module 22 of the vehicle-mounted system 20 has been activated, it can communicate with the transmission module 33 of the external positioning terminal 30 and accordingly acquire the desired position information from the transmission module 33 of the external positioning terminal 30. The vehicle-mounted system 20 may have been previously paired with some external positioning terminals. To be specific, the vehicle-mounted system 20 may, prior to the current startup, have already been connected to some external positioning terminal and may have further stored the connection record.

Specifically, the first processing module 21 may control the reception module 22 to select and connect to the external positioning terminal 30 which takes the least time to build up connection with the vehicle-mounted system 20. For example, if an external positioning terminal 30 in the vicinity has been previously paired with the vehicle-mounted system 20, and the corresponding connection record has been saved, then no verification would be needed in the subsequent connection, which can thus greatly accelerate the connection speed. Therefore, the vehicle-mounted system 20 may typically give such an external positioning terminal highest priority and then connect to it.

In other embodiments, according to the device types of the at least one external positioning terminal in the vicinity, the first processing module 21 can control the reception module 22 to select and connect to the external positioning terminal 30 with the highest positioning precision. Alternatively, the priority policy can also combine the above two manners. For example, on the premise that the connection times are below a threshold value, the external positioning terminal with the highest positioning precision will be selected and connected to. However, the specific configuration of the priority policy is by no means limited thereto, and those skilled in the art can appreciate that the priority policy can also be planned in other forms. For instance, the priorities of the external positioning terminals can be set manually. Taking as an example, the vehicle owner can set the priority level of his own mobile phone to be the highest, thus the mobile phone will be first chosen to connect to.

In one case, the local GPS positioning module 23 may be activated only after the operating system of the vehicle-mounted system 20 has booted up, so as to get position information. Since the vehicle-mounted system 20 can use the position information acquired from the external positioning terminal 30 before the local GPS positioning module 23 can provide any useful position information, therefore saving time required for the activation and positioning of the local GPS positioning module 23.

In another case, the local GPS positioning module 23 may be activated simultaneously when the vehicle-mounted operating system is started, but the local GPS positioning module 23 may have not yet acquired position information when the startup of the vehicle-mounted operating system has been completed, thus the time required for the positioning of the local GPS positioning module 23 can be saved compared with the prior art.

The quick positioning system, according to the present embodiment, can acquire and use the position information from an external positioning terminal after the vehicle-mounted system is started and before any position information is available from the local GPS positioning module, thus there would be available position information for the vehicle-mounted system before the GPS module of the vehicle-mounted system is fully activated to enhance the positioning efficiency of the vehicle-mounted system. Furthermore, the vehicle-mounted system can choose the external positioning terminal with the highest priority level according to a predetermined priority policy to acquire position information therefrom, thus increasing the positioning speed of the vehicle-mounted system.

The above description is merely embodiments of the disclosure, but is not limiting the scope of the disclosure. Any equivalent structures or flow transformations made to the disclosure, or any direct or indirect applications of the disclosure on any other related fields, shall all be covered within the protection of the disclosure.

The invention claimed is:

1. A quick positioning method in a vehicle-mounted system, comprising:
    acquiring position information of the vehicle-mounted system from an external positioning terminal in a vicinity of the vehicle-mounted system at the same time the vehicle-mounted system is started, and determining continuously whether the position information is available from a local GPS (global positioning system) positioning module, until determining that the position information is available from the local GPS positioning module; and
    using the position information acquired from the external positioning terminal until the position information is available from the local GPS positioning module;
    wherein after determining that the position information is available from the local GPS positioning module, using the position information acquired from the local GPS positioning module, stopping acquiring the position information from the external positioning terminal in the vicinity, and stopping determining whether the position information is available from the local GPS positioning module.

2. The quick positioning method according to claim 1, further comprising:
    continuing acquiring position information from the external positioning terminal in the vicinity after determining that position information is available from the local GPS positioning module; and
    turning to use the position information acquired from the external positioning terminal in the vicinity once position information is not available from the local GPS positioning module.

3. The quick positioning method according to claim 1, wherein acquiring position information from the external positioning terminal in the vicinity comprises:
    searching for at least one external positioning terminal in the vicinity of the vehicle-mounted system;
    selecting and connecting to the external positioning terminal with highest priority according to a predetermined priority policy; and
    acquiring the position information from the external positioning terminal with the highest priority.

4. The quick positioning method according to claim 3, wherein selecting and connecting to the external positioning terminal with the highest priority according to the predetermined priority policy comprises:
    selecting and connecting to the external positioning terminal which takes the least time to build up a connection with the vehicle-mounted system.

5. The quick positioning method according to claim 3, wherein selecting and connecting to the external positioning terminal with the highest priority according to the predetermined priority policy comprises:
    selecting and connecting to the external positioning terminal with highest positioning precision based on device types of the at least one external positioning terminal in the vicinity, wherein a device type of at least one of the external positioning terminal is preset to be a device type with highest positioning precision manually.

6. A vehicle-mounted system, comprising a processing module, a reception module, and a local GPS positioning module, wherein the processing module is configured to control the reception module to acquire position information of the vehicle-mounted system from an external positioning terminal in the vicinity the same time when the vehicle-mounted system is started, and to determine continuously whether position information is available from the local GPS positioning module, until determining that the position information is available from the local GPS positioning module, and to use the position information from the external positioning terminal until the position information is available from the local GPS positioning module;
    wherein after the processing module determines that position information is available from the local GPS positioning module, the processing module is further configured to use the position information acquired from the local GPS positioning module, control the reception module to stop acquiring position information from the external positioning terminal, and stop determining whether position information is available from the local GPS positioning module.

7. The vehicle-mounted system according to claim 6, wherein after the processing module determines that position information is available from the local GPS positioning module, the processing module is further configured to control the reception module to continue acquiring position information from the external positioning terminal, and to turn to use the position information acquired from the external positioning terminal once the position information is unavailable from the local GPS positioning module.

8. The vehicle-mounted system according to claim 6, wherein the processing module is configured to control the reception module to search for at least one external positioning terminal in the vicinity of the vehicle-mounted system, and to select and connect to the external positioning terminal with highest priority according to a predetermined priority policy, and the processing module is further configured to control the reception module to acquire position information from the external positioning terminal with the highest priority.

9. The vehicle-mounted system according to claim 8, wherein the processing module is configured to control the reception module to select and connect to the external positioning terminal which takes the least time to build up a connection with the vehicle-mounted system.

10. The vehicle-mounted system according to claim 8, wherein the processing module is configured to control the reception module to select and connect to the external positioning terminal with highest positioning precision based on device types of the at least one external positioning terminal in the vicinity, a device type of at least one of the external positioning terminal is preset to be a device type with highest positioning precision manually.

* * * * *